United States Patent
Sethi et al.

(10) Patent No.: US 11,561,880 B2
(45) Date of Patent: Jan. 24, 2023

(54) METHOD TO ANALYZE IMPACT OF A CONFIGURATION CHANGE TO ONE DEVICE ON OTHER CONNECTED DEVICES IN A DATA CENTER

(71) Applicant: Dell Products L. P., Round Rock, TX (US)

(72) Inventors: Parminder Singh Sethi, Ludhiana (IN); Sathish Kumar Bikumala, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 511 days.

(21) Appl. No.: 16/804,921

(22) Filed: Feb. 28, 2020

(65) Prior Publication Data

US 2021/0271584 A1  Sep. 2, 2021

(51) Int. Cl.
| | |
|---|---|
| *H04L 41/08* | (2022.01) |
| *H04L 41/0873* | (2022.01) |
| *G06F 11/34* | (2006.01) |
| *G06F 11/30* | (2006.01) |
| *G06F 9/445* | (2018.01) |
| *G06F 11/32* | (2006.01) |

(52) U.S. Cl.
CPC ...... *G06F 11/3495* (2013.01); *G06F 9/44505* (2013.01); *G06F 11/3006* (2013.01); *G06F 11/3051* (2013.01); *G06F 11/328* (2013.01); *H04L 41/08* (2013.01); *H04L 41/0873* (2013.01)

(58) Field of Classification Search
None
See application file for complete search history.

(56) References Cited

U.S. PATENT DOCUMENTS

| | | | |
|---|---|---|---|
| 2016/0274558 A1* | 9/2016 | Strohmenger | G05B 15/02 |
| 2021/0409271 A1* | 12/2021 | Jacob Da Silva | H04L 43/04 |
| 2022/0286351 A1* | 9/2022 | Liao | H04L 41/0668 |

* cited by examiner

*Primary Examiner* — Angela Nguyen
(74) *Attorney, Agent, or Firm* — Krishnendu Gupta; Deepika Bhayana; Derek Lam

(57) ABSTRACT

Various systems and methods are provided for analyzing the effect(s) that a configuration change to one device has on other connected devices. In one embodiment, the disclosed functionality includes determining connectivity information associated with a data center, where the data center comprises at least a first device and a second device; discovering one or more changes to a configuration of the first device; determining, based at least in part on the connectivity information, that the second device is impacted by the one or more changes to the configuration of the first device; and determining one or more impacts to the second device as a result of the one or more changes, where each of the one or more impacts indicates a positive impact to the second device, a negative impact to the second device, or no impact to the second device.

20 Claims, 7 Drawing Sheets

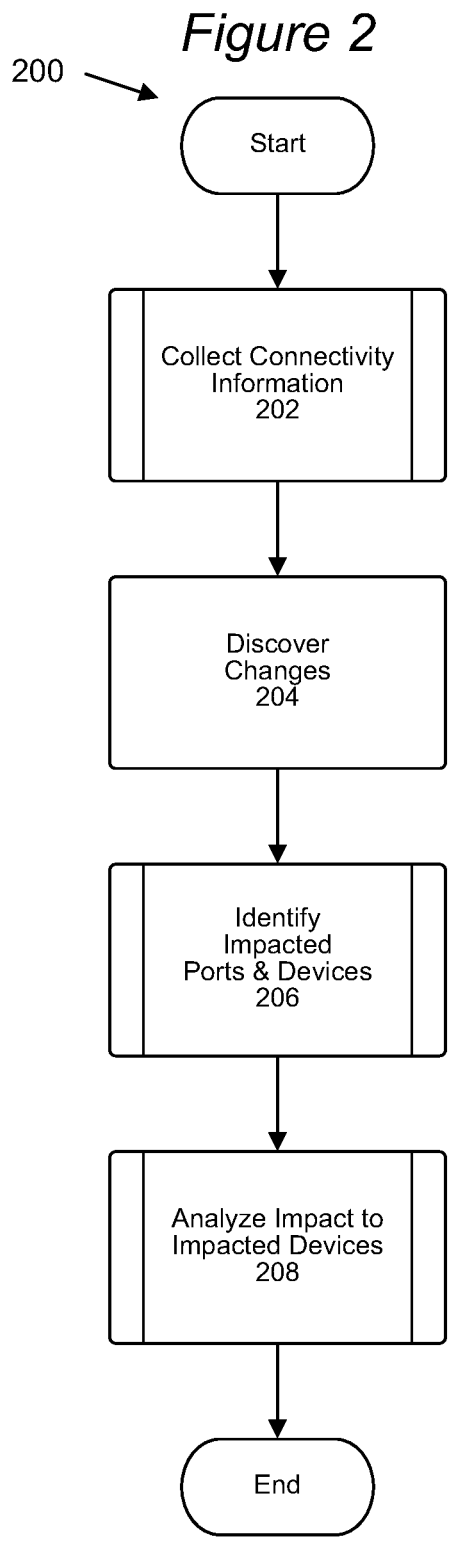

METHOD TO ANALYZE IMPACT OF A CONFIGURATION CHANGE TO ONE DEVICE ON OTHER CONNECTED DEVICES IN A DATA CENTER

BACKGROUND OF THE INVENTION

Field of the Invention

This disclosure generally relates to configuration management, and more specifically relates to the automated detection of one or more configuration change(s) to a device in a data center (or similar computing environment) and the proactive automated analysis of the impact that any such changes may have on other connected devices.

Description of the Related Art

As the speed of work increases, any given device in a data center (or other computing environments) may undergo multiple changes to its configuration over a period of time. Moreover, as such computing environments grow in size and complexity, the number of connected devices that can be impacted by a change to another device in that computing environment also increases, as do the costs associated with decreased performance of such devices, as well as from the downtime that can often be required to troubleshoot and fix devices that are performing poorly or even outright shutdown or fail. Tracking and analyzing such changes, and their impact on connected devices, can be complex, time-consuming, and subject to user error, especially for users who are not overly familiar with the internal workings of the computing devices that they are attempting to service. As such, functionality is desirable to automatically detect any configuration changes that occur in a computing environment, to proactively analyze the impact that any such changes have on other connected devices in that computing environment.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

This disclosure generally includes methods, computer program products, computer systems, and the like, that provide for automatically detecting any configuration changes that occur in a computing environment, for proactively and automatically analyzing the impact that any such changes have on other connected devices in that computing environment, as well as suggesting and/or automatically performing remedial measures that may be desirable or needed as a result of such a change. As described more fully herein, functionality is provided to proactively collect connectivity information about a computing environment and proactively discover any configuration changes that occur to that computing environment after the connectivity information was collected. The connectivity information can be used to identify any devices (and ports thereon) that were impacted by the configuration change, and to analyze the actual impact that the configuration change had on each such impacted device, as well as suggesting and/or automatically performing remedial measures that may be desirable or needed as a result of such a change according to the functionality disclosed herein.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

FIG. 2 is a flowchart for performing various steps of a process to analyze the effect of a change to impacted devices, according to one embodiment of this disclosure.

DETAILED DESCRIPTION

This disclosure generally includes methods, computer program products, computer systems, and the like, that provide for automatically detecting any configuration changes that occur in a computing environment, for proactively and automatically analyzing the impact that any such changes have on other connected devices in that computing environment, as well as suggesting and/or automatically performing remedial measures that may be desirable or needed as a result of such a change. As described more fully herein, functionality is provided to proactively collect connectivity information about a computing environment and proactively discover any configuration changes that occur to that computing environment after the connectivity information was collected. The connectivity information can be used to identify any devices (and ports thereon) that were impacted by the configuration change, and to analyze the actual impact that the configuration change had on each such impacted device, as well as suggesting and/or automatically performing remedial measures that may be desirable or needed as a result of such a change according to the functionality disclosed herein.

Figure 1A:
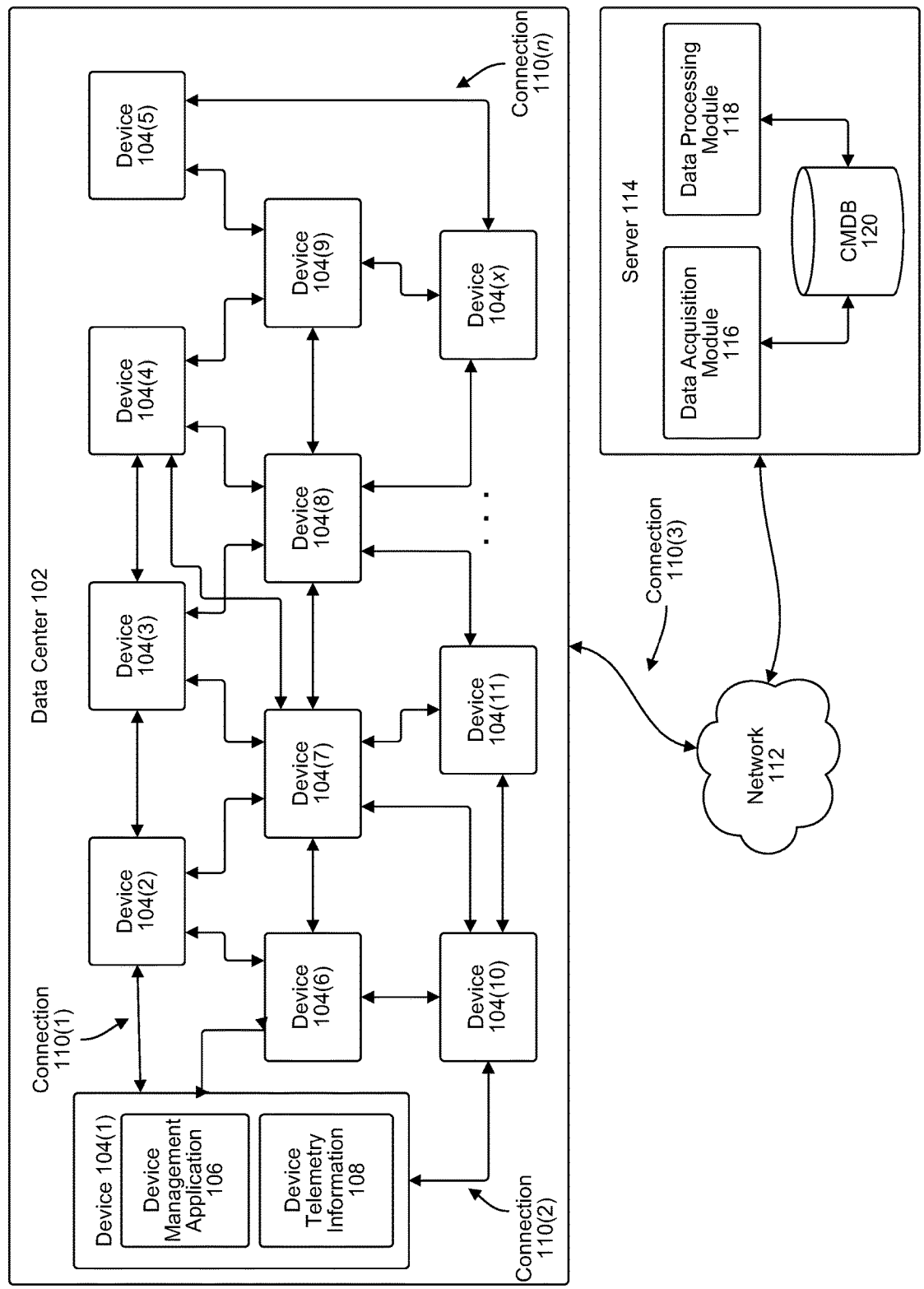
FIG. 1A is a block diagram depicting an example computing environment, according to one embodiment of this disclosure.

FIG. 1A illustrates a block diagram of an example computing environment 100 that includes a data center 102. Although only one data center 102 is expressly depicted in FIG. 1A, in other embodiments more than one data center 102 can be included in any given computing environment(s) 100. Data center 102 includes a plurality of devices 104(1)-104(x) (collectively, "device(s) 104"). In other embodiments, any given data center 102 can include more or less device(s) 104 than are shown in the example embodiment provided in FIG. 1A. Additionally, the device(s) 104 in any given data center 102 can be arranged and connected in various manners other than as depicted in the example embodiment provided in FIG. 1A.

In certain embodiments, each device 104 can be a computing device, such as, e.g., a server, personal computer, laptop computer, notebook computer, personal computing device (e.g., a smart phone), server, router, switch, or any other computing device as described herein. In other embodiments, each device 104 can also be an auxiliary device, such as, e.g., a monitor, speaker, webcam, television or other display device, printer, scanner, telephone, or even an industrial device such as a HVAC device. As shown in the example of device 104(1), each device 104 can, but does not have to, include, at least, a device management application (such as, e.g., Device Management Application 106) and telemetry information (such as, e.g., Device Telemetry Information 108). In other embodiments, a device management application (such as, e.g., Device Management Application 106) can be installed on a single computing device within the data center (such as, e.g., an administrator's computing device) and can be used to collect the telemetry information for other computing devices on the fly (rather than having to necessarily store telemetry information on each computing device. Device Management Application 106 can be any device management application (such as, e.g., DELL's SUPPORTASSIST device management application) that is configured to perform various features and functionality as described herein, including, at least and for example, collecting and transmitting information about the host device's ports, connections, and so forth, such as, e.g., Device Telemetry Information 108. (Although Device Management Application 106 and Device Telemetry Information 108 are only expressly shown as being part of device 104(1), which is done primarily for the sake of space in the drawing, the reader should assume that each device 104 can be configured to include these components. Alternatively, and as noted above, in certain embodiments a device management application (such as, e.g., Device Management Application 106) can be installed on a single computing device within the data center (such as, e.g., an administrator's computing device) and can be used to collect the telemetry information for other computing devices on the fly (rather than having to necessarily store telemetry information on each computing device.) Moreover, although not expressly shown in FIG. 1A, to the extent that any device 104 is a computing device (as well as certain auxiliary devices), that device can also include various hardware and software components, such as, e.g., a microprocessor, memory (which is capable of storing data, including, e.g., Device Telemetry Information 108), a display screen, networking capabilities, an operating system, one or more other applications (in addition to Device Management Application 106, which may be present on certain computing device(s) in any given data center or other such computing environment as those terms are described herein), and so forth. Moreover, as will be discussed in more detail in conjunction with FIG. 1B and elsewhere herein, each device 104 can include one or more ports, which are discussed in more detail below.

As also shown in FIG. 1A, devices 104 are connected to each other via a series of connections 110(1)-110(n) (collectively, "connection(s) 110"). Each of the connections 110 can be any sort of wired and/or wireless network connection, such as an Ethernet connection, a Fiber Optic connection, a BLUETOOTH connection, an HDMI cable (among various other cables and wired connections), and so forth, including various combinations of the foregoing technologies. Each connection 110 may include and/or be facilitated by a networking component, such as a switch, a router, an access point, or the like. Although each device 104 in FIG. 1A is shown as only having direct connections to a certain number of other devices 104, in practice each device can be connected to more or less other devices 104 (and, similarly, can include more or less ports on the device itself) than is shown in FIG. 1A (and in FIG. 1B, which is discussed in more detail below). As will be discussed in more detail in conjunction with FIG. 1B, below, the point at which each connection is "connected" to each device 104 can be a port (or some other component similar to a port). For instance, in the example configuration shown in FIG. 1A, device 104(6) is directly connected to four other devices (e.g., devices 104(1), 104(2), 104(7), and 104(10)), and thus, in certain embodiments, is using four ports. Likewise, device 104(7) is directly connected to seven other devices (e.g., devices 104(2), 104(3), 104(4), 104(6), 104(8), 104(10), and 104(11)), and thus, in certain embodiments, is using seven ports. Moreover, each device 104 can have one or more other ports that are not being used ("unused ports") at any time.

As used throughout this disclosure, the reader will appreciate that the letters x and n (and other such letters, such as the letter y, which is used below) is/are used to indicate a variable number of devices or components. Although such letters are used in describing a variable number of instances of each of these different devices and components, a repeated use of a given letter (e.g., y) does not necessarily indicate that each device and component has a same number (e.g., y) of instances implemented in the example system discussed herein, or in any other embodiment of this invention.

Data center 102 can be connected to a network 112 via one or more connections 110, and ultimately connected to server 114. (Although not expressly shown in FIG. 1A, each device 104 can also be connected and/or communicably coupled to server 114 via network 112 and one or more connections 110.) Network 112 can be any sort of network, including a local area network ("LAN"), wide area network ("WAN"), storage area network ("SAN"), the Internet, an intranet, and so forth. Although only one network 112 is depicted in FIG. 1A for the sake of explanation, in practice more or less instances of network 112 can be used. Moreover, in embodiments that include more than one data center 102, more than one data center 102 can be connected to a single network 112.

Server 114 can be any computing device, such as a server, personal computer, laptop computer, notebook computer, or any other computing device that is capable of performing various aspects of the functionality described herein. Although not expressly shown in FIG. 1A, server 114 can also include other components that are necessary for its functionality, such as a microprocessor, memory, networking capabilities, and so forth. Although only a single server 114 is depicted in FIG. 1A, in practice more than one server can be used, and the components and/or functionality of server 114 can be divided among multiple such servers.

As can be seen from FIG. 1A, server 114 is configured to execute various software module, such as, e.g., Data Acquisition Module 116, which can be used to provide various functionality related to the acquisition of data (such as Device Telemetry Information 108) about one or more of the devices 104 in a data center, as well as data about changes made to any devices 104 or any other component of computing system, such as computing environment 100; and Data Processing Module 118, which can be used to process the data acquired in various ways. In certain embodiments, Data Acquisition Module 116 and/or Data Processing Module 118 are hardware and/or software modules configured to perform various aspects of the functionality described herein. In one embodiment, Data Acquisition Module 116 and/or Data Processing Module 118 can be part of a device management application, and/or can be communicably coupled to a device management application, such as, e.g., Device Management Application 106. In other embodiments, other configurations and relationships are possible as well.

Server 114 is also configured to include (or be communicably coupled to) a database and particularly a configuration management database, such as CMDB 120. CMDB 120 can be any database (or other data store), although CMDB 120 should generally be configured to store and provide access to various pieces of configuration information, such as, e.g., configuration information related to the configuration of (and changes to) computing environment 100, data center 102, one or more devices 104, and/or components of any of the foregoing (such as, e.g., hard disks). In various embodiments, CMDB 120 can also include various other categories of information, such as, e.g., inventory information, incident management information (e.g., information about an infrastructure component that broke), problem management information (e.g., information about defects in a system's infrastructure), event management information (e.g., notifications and information about a metric that has exceeded a threshold value), reporting information (e.g., information related to compliance, auditing, and other regulatory requirements), and change management information (e.g., information indicating how a change to a system will affect other aspects of a customer's business). In certain embodiments, CMDB 120 can also include information about change requests ("CRQ information"). In other embodiments, CRQ information can be stored in a separate storage location (not shown in FIG. 1A) that is separate and distinct from CMDB 120. Regardless of where and how CRQ information is stored, this CRQ information (and/or CMDB) can include information about all planned changes that were requested to be made (such as, e.g., via a change request ("CRQ") "ticket" or other such request) to a device and/or other component and/or software service of a data center or computing environment. CMDB 120 can also include information about unplanned changes such as, e.g., incident data, agent data, and service restarts, in addition to other such information.

Moreover, although one specific configuration is shown in FIG. 1A, many other configurations of computing environment 100 are possible. For instance, although a certain number of devices 104 are depicted in FIG. 1A, in practice this invention can be used with more or less devices 104. Likewise, more or less networks 112, network connections 110, and servers 114 are possible. Other configurations are possible as well.

Figure 1B:
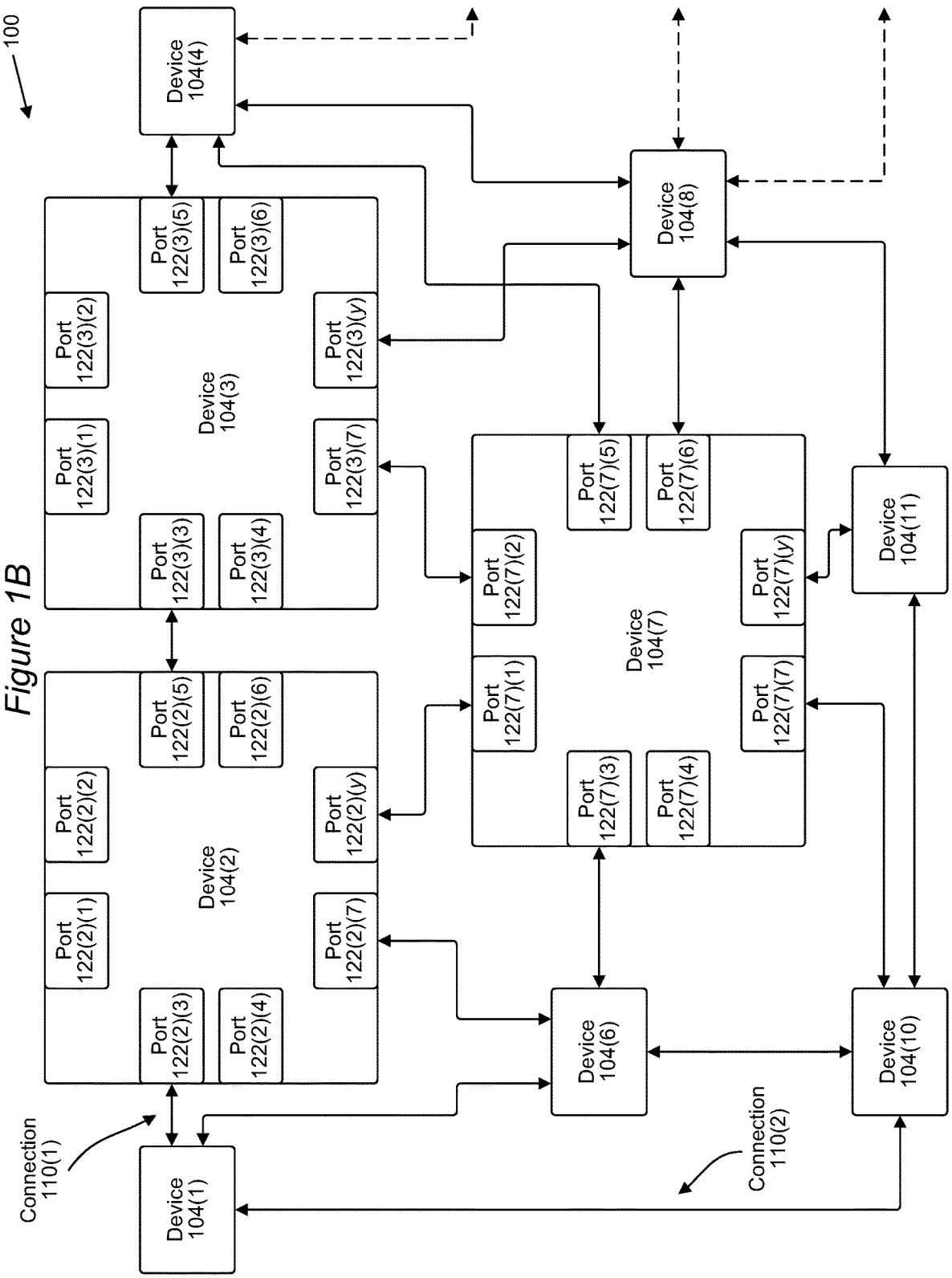
FIG. 1B is a block diagram depicting an enhanced view of certain components of the example computing environment, including port-level information about certain devices, according to one embodiment of this disclosure.

FIG. 1B is a block diagram illustrating an enhanced view of certain devices 104 of example computing environment 100, and particularly depicting port-level information about devices 104(2), 104(3), and 104(7), according to one embodiment of this disclosure. As can be seen in this diagram, and with reference to FIG. 1A, FIG. 1B includes devices 104(1), 104(2), 104(3), 104(4), 104(6), 104(7), 104(8), 104(10), and 104(11), and more particularly includes enhanced details of devices 104(2), 104(3), and 104(7). (Although not expressly shown in FIG. 1B (primarily for the sake of space), the reader should assume that each device 104 in FIG. 1A has one or more ports 122, including the devices 104 for which no ports are shown in FIG. 1B, and including the devices 104 that appear in FIG. 1A but which are not expressly shown in FIG. 1B.)

More specifically, FIG. 1B depicts ports 122(2)(1)-122(2)(y) on device 104(2) (collectively, "ports 122(2)"), ports 122(3)(1)-122(3)(y) on device 104(3) (collectively, "ports 122(3)"), and ports 122(7)(1)-122(7)(y) on device 104(7) (collectively, "ports 122(7)"). Regarding the numbering of these ports herein, the reader will appreciate that the indexes (2), (3), and (7) refer to the device on which the ports are found, and the indexes (1)-(y) indicate the port number on any given device. For instance, port 122(3)(4) is a reference to the fourth port 122 on device 104(3). The reader will also appreciate that all of these ports can collectively be referred to herein as "port(s) 122." Moreover, as noted elsewhere herein, the use of the letter y with respect to these ports indicates a variable number of ports 122 on each device 104, but the letter y should not be interpreted as necessarily requiring any device 104 to have the same number y of ports as any other device(s) 104. As such, each device 104 can include more or less ports than the eight ports shown on devices 104(2), 104(3), and 104(7) in FIG. 1B. Moreover, the ports 122 on any given device 104 do not have to appear in the same arrangement shown in FIG. 1B. For instance, in certain devices, the ports may only be provided on the front and/or back, but not on the sides. In other embodiments, many other arrangements of the ports on any given device are possible as well.

Each port 122 can be a hardware port or a software port. A hardware port can be thought of, e.g., as a physical interface and/or point of connection between two devices, through which an external device can be connected to the device upon which the port resides. Examples of hardware ports include a/an Ethernet port, USB port, Firewire port, Lightning port, modem port, serial port, parallel port, audio/video port, SCSI port, DisplayPort, Mini DisplayPort, HDMI port, DVI port, VGA/SVGA port, and power connector, as each of those terms can be understood in both the specific and the general sense, as appropriate, and among many other such examples of hardware ports that can be part of a device, such as, e.g., any device 104. A software port can be thought of as a logical construct that identifies a specific process or a type of network service.

FIG. 1B also includes various connections 110. Although only connections 110(1) and 110(2) are expressly labeled as such, the reader will appreciate that each line with arrows shown in FIG. 1B represents a connection, including both solid lines with arrows as well as dashed lines with arrows. As can be seen from the enhanced details of devices 104(2), 104(3), and 104(7), each of these connections 110 serves to connect a port on one device 104 to a port on another device 104. (The reader should assume that the same is true with respect to the devices 104 for which enhanced, port-level details are not expressly shown in FIG. 1B.) By way of example, the reader will notice that port 122(2)(y) on device 104(2) connects that device to port 122(3)(1) on device 104(7). As another example, port 122(3)(7) on device 104(3) connects that device to port 122(3)(2) on device 104(7). Moreover, port 122(2)(7) on device 104(2) connects that device to a port on device 104(6), although the specific port being used on device 104(6) is among the details that are not shown in the example embodiment shown in FIG. 1B. Moreover, the reader should understand that the arrows connected by dashed lines indicate connections to devices 104 that are not expressly shown in FIG. 1B, but whose existence and location can be inferred from FIG. 1A. For instance, the dashed line extending down and to the right of device 104(4) can be inferred as a port-to-port connection between device 104(4) and device 104(9), as can be seen in more detail in FIG. 1A.

The reader will appreciate that not all of the devices 104 from FIG. 1A are shown in FIG. 1B, which is done primarily for the sake of space in the drawing. The reader will also appreciate that the enhanced details of device 104(1) that were shown in FIG. 1A are not included in FIG. 1B, which is also done primarily for the sake of space. Nevertheless, these omissions from FIG. 1B should not be construed as any implication that the devices (and features thereof) that were expressly shown in FIG. 1A but are omitted from FIG. 1B are somehow incompatible with the FIG. 1B, but rather, that these omissions in FIG. 1B are made primarily for the sake of space and so that attention may be focused on other aspects of computing environment 100, namely, on the various ports (and the enhanced details regarding the connections to certain of those ports) that are shown in FIG. 1B.

Figure 3:
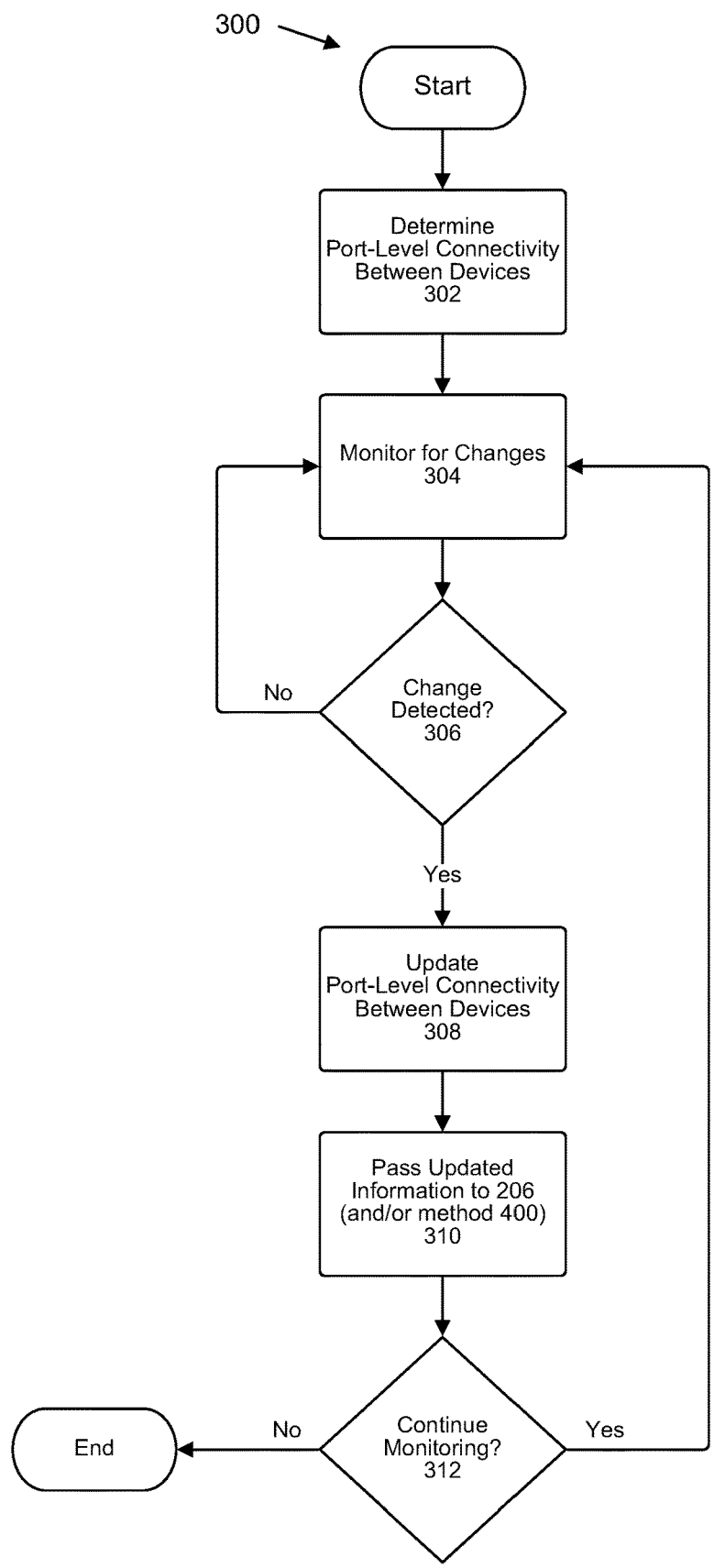
FIG. 3 is a flowchart for performing various steps of a process to collect connectivity information, according to one embodiment of this disclosure.
Figure 4:
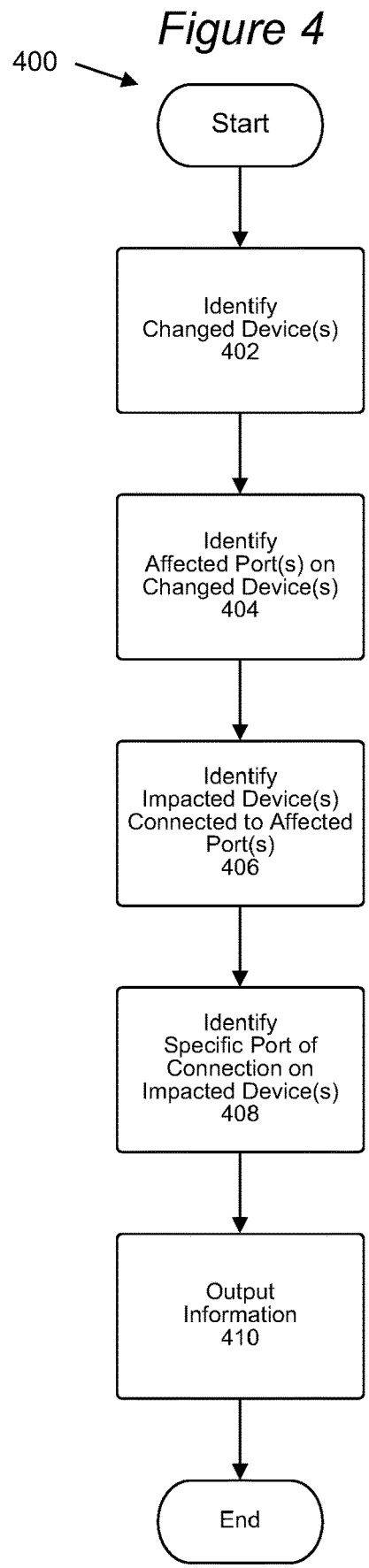
FIG. 4 is a flowchart for performing various steps of a process to identify one or more impacted devices, according to one embodiment of this disclosure.
Figure 5:
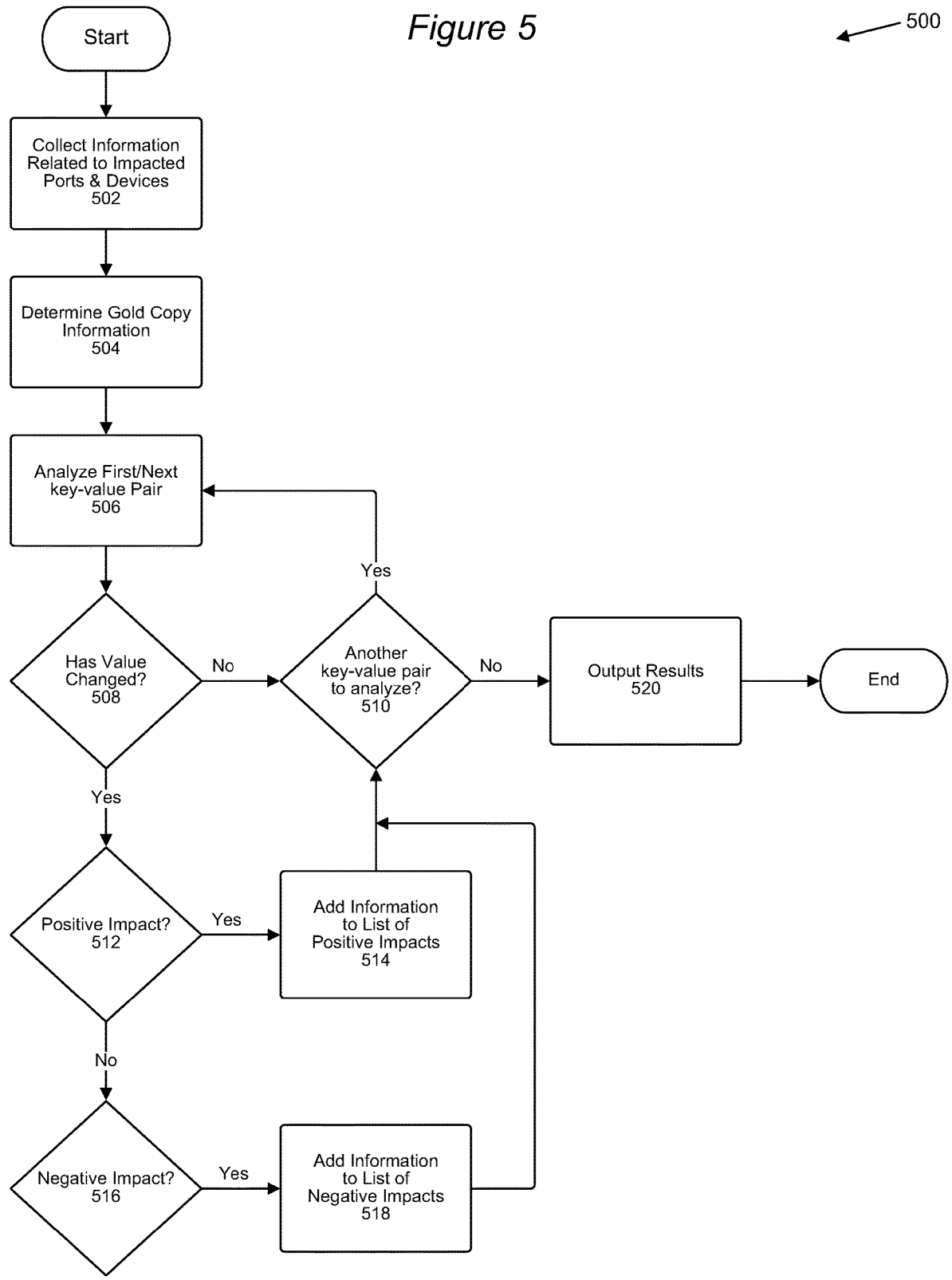
FIG. 5 is a flowchart for performing various steps of a process to analyze the effect that a change has on an impacted device, according to one embodiment of this disclosure.

FIGS. 2, 3, 4, and 5 collectively illustrate various actions generally pertaining to the functionality disclosed herein, such as, e.g., collecting connectivity information about various devices, such as, e.g., devices 104 and/or other components of data center 102 and/or computing environment 100; discovering any changes that occur to such devices; identifying other devices that are impacted by a change to such a device; and using various information and functionality to analyze the impact of such a change to any devices that are impacted by that change. In slightly more detail, FIG. 2 provides an overview of such functionality, and FIGS. 3, 4, and 5 provide enhanced details of various steps depicted in FIG. 2. As will also be appreciated in light of the present disclosure, each of these methods may be modified in order to derive alternative embodiments. Moreover, although the steps in the embodiments of these methods that are discussed herein are shown in a sequential order, certain steps may occur in a different order than shown, certain steps may be performed concurrently, certain steps may be combined with other steps, and certain steps may be omitted in another embodiment. For discussion purposes, methods 200, 300, 400, and 500 are described with reference to elements such as those described in connection with FIGS. 1A and 1B, as described above, although other models, frameworks, systems, and environments may be used to implement these processes. In the flow diagram included in each of these figures, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes.

Turning now to FIG. 2, FIG. 2 is a flowchart of a method 200 illustrating various actions performed in connection with one embodiment of the systems and techniques disclosed herein. For discussion purposes, the process 200 is described with reference to elements such as those described in connection with FIG. 1A and FIG. 1B as described herein, although other models, frameworks, systems and environments may be used to implement these processes. To provide more detail, FIG. 2 is a flowchart of a process 200 that illustrates various actions that can be performed in conjunction with this disclosure, such as can generally be viewed, e.g., from the perspective of a server (such as, e.g., server 114) and/or a module or other component thereof (such as, e.g., Data Acquisition Module 116 and/or Data Processing Module 118). In certain embodiments, however, process 200 may be performed by any computing device as described herein, and process 200 may also be performed in conjunction with one or more steps of one or more other processes described herein, such as methods 300, 400, and 500, each of which provide enhanced details of various steps of method 200.

In one embodiment, method 200 begins at 202, where method 200 collects connectivity information about one or more devices 104 and, at least potentially, one or more other components that may be present in a given data center. In one embodiment, this functionality can be performed by device management hardware and/or software, such as, e.g., DELL's SUPPORTASSIST software, Device Management Application 106, and/or Data Acquisition Module 116. In other embodiments, this step can be performed by other hardware and/or software components. One purpose and result of this step is to determine or otherwise learn the connections between various different devices in a computing environment, data center, or other collection of devices. In certain embodiments, the information that is collected includes information about the various port connections on and between each devices 104 (and/or other such components or devices) within the operating scope of the component performing this step. This information can be referred to as telemetry information, and can be and/or include Device Telemetry Information 108 for each device 104 for which such information is collected. Further details of step 202 are provided in FIG. 3 and the accompanying discussion of method 300, below.

At 204, method 200 discovers any changes that have occurred to the relevant component(s) (e.g., computing environment 100, data center 102, and/or devices 104) since the connectivity information was originally collected in 202. In one embodiment, this functionality can be performed by device management hardware and/or software, such as, e.g., DELL's SUPPORTASSIST software, Device Management Application 106, and/or Data Acquisition Module 116. In other embodiments, this step can be performed by other hardware and/or software components. In certain embodiments, such changes can be discovered by reading application logs, agent alerts (e.g., information about service/server restarts), information in a CMDB (such as, e.g., CMDB 120), and/or change request information ("CRQ information") (when such information is stored outside of a CMDB), among other such sources of information that can be read in this step. As such, this information should collectively cover all planned and unplanned changes to any device(s) and/or other component(s) and/or software service(s) (among other potential components) of a data center or computing environment.

At 206, method 200 uses the information collected in 202 and the changes discovered in 204 to identify any devices that were impacted ("impacted device(s)") by one or more of the changes discovered in 204, as well as the impacted port on each impacted device. In one embodiment, this functionality can be performed by device management hardware and/or software, such as, e.g., DELL's SUPPORTASSIST software, Device Management Application 106, and/or Data Processing Module 118. In other embodiments, this step can be performed by other hardware and/or software components. One purpose and result of this step is to enable the systems and methods disclosed herein to determine a list of the devices (and the port(s) thereon) that were (at least potentially) impacted as the result of the changes that were performed on, or happened to, one or more other devices in a data center or other computing environment. For example, and referring to the specific configuration shown in FIG. 1A, if a change to device 104(7) is detected (such as, e.g., in 204), device 104(7) would be identified as the changed device. Continuing with the same example, and as will be explained in more detail below, 206 (and method 400) may determine that only two ports (out of the seven ports in use) on device 104(7) were affected by the configuration change to device 104(7), with those being, for the sake of this example, ports 122(3)(1) and 122(3)(2). As such, step 206 (and method 400) would identify ports 122(3)(1) and 122(3)(2) as the affected ports on the changed device. Continuing with the same example, and as will be explained in more detail below, 206 (and method 400) may also determine that as a result of the foregoing, port 122(2)(y) on device 104(2) and port 122(3)(7) on device 104(3) may have been impacted by the change to device 104(7), since, e.g., they are the ports connected to the affected ports (ports 122(3)(1) and 122(3)(2)) on the changed device. As such, step 206 (and method 400) may ultimately determine and/or output information identifying these impacted devices and ports (port 122(2)(y) on device 104(2) and port 122(3)(7) on device 104(3)), which information can then be used in 208 (and method 500) to perform that step.

In addition to the example embodiment discussed above, in certain other embodiments the list of ports and devices that are (at least potentially) affected by the change to the impacted device can also include devices that are indirectly connected to the device to which the change was made (i.e., the changed device). For instance, in certain embodiments, the collection of impacted devices and ports that are determined by 206 (and method 400) may include the devices that are within n-hops (e.g., 2 hops) of the device to which the change was made. In still other embodiments, every component within a data center can be (at least potentially) impacted by a change to any other component in the data center, and thus every such device 104 (along with the relevant port on each such device 104) would be included in the collection of impacted devices and ports identified in 206. Further details of step 206 are provided in FIG. 4 and the accompanying discussion of method 400, below.

At 208, method 200 analyzes the impact of the change(s) detected in 204 with respect to the impacted device(s) identified in 206. In one embodiment, this functionality can be performed by device management hardware and/or software, such as, e.g., DELL's SUPPORTASSIST software, Device Management Application 106, and/or Data Processing Module 118. In other embodiments, this step can be performed by other hardware and/or software components. One purpose and result of this step is to determine the manner in which any of the (at least potentially) impacted devices are actually impacted by the change(s) detected in 204, and to further determine whether such impact(s) are positive or negative, and/or whether they require any further attention (e.g., from the customer, from a technical support person, an automated response from the system, and so forth). The details of step 208 are provided in FIG. 5 and the accompanying discussion of method 500, below.

Turning next to FIG. 3, FIG. 3 is a flowchart of a method 300 illustrating various actions performed in connection with one embodiment of the systems and techniques disclosed herein. For discussion purposes, the process 300 is described with reference to elements such as those described in connection with FIG. 1A and FIG. 1B as described herein, although other models, frameworks, systems and environments may be used to implement these processes. To provide more detail, FIG. 3 is a flowchart of a process 300 that illustrates various actions that can be performed in conjunction with this disclosure, such as can generally be viewed, e.g., from the perspective of a server (such as, e.g., server 114) and/or a module or other component thereof (such as, e.g., Data Acquisition Module 116 and/or Data Processing Module 118). In certain embodiments, however, process 300 may be performed by any computing device as described herein, and process 300 may also be performed in conjunction with one or more steps of one or more other processes described herein, such as methods 200, 400, and 500. In particular, in certain embodiments FIG. 3 provides enhanced details of step 202. As such, and in certain embodiments, method 300 can be performed by a separate computer programming "thread" (or other such functionality) that is distinct from the "thread" (or other such functionality) that is being used to perform method 200, so that, for example, the monitoring and loopbacks shown in FIG. 3 do not hinder the perform of other portions of method 200 (other than step 202, the details of which are being provided in FIG. 3 and performed by one or more component(s) and/or module(s) that is/are configured to perform method 300).

In one embodiment, method 300 begins at 302, where method 300 determines the port-level connectivity between various devices, such as, e.g., devices 104(1)-104(x) in data center 102. In one embodiment, this functionality can be performed by device management hardware and/or software, such as, e.g., DELL's SUPPORTASSIST software, Device Management Application 106, and/or Data Acquisition Module 116. In other embodiments, this step can be performed by other hardware and/or software components. One purpose and result of this step is to determine or otherwise learn the connections (and particularly, the port-level connections) between various different devices in a computing environment, data center, or other collection of devices. (Any device that is connected to another device can be thought of as a "connected device," and may be referred to as such herein. For example, a first device is said to be connected to a second device when there is a linkage (communicative coupling) between the two devices. For example, the linkage may be any sort of connection, as described above, e.g., a wired connection (e.g., Ethernet cable, USB cable, or the like) or a wireless connection (e.g., Wi-Fi, Bluetooth or the like). The linkage may be facilitated by a networking component, such as a switch, a router, an access point, or the like. For example, both the first device and the second device may be connected to a networking component that directly connects the first component to the second component. The direct connection may enable the devices to, for example, directly exchange data without the data passing through a third device.) In certain embodiments, the information that is collected includes information about the various port connections on and between each device 104 (and/or other such components or devices) within the operating scope of the component performing this step. In certain embodiments, this information can include not only information about which other device (if any) or other component (if any) is connected to each port of a given device, but also which port of the connected device or component is connected to each in-use port of a given device. This information can be referred to as telemetry information, and can be and/or include Device Telemetry Information 108 for each device 104 for which such information is collected. Moreover, this information can be represented by, and stored in, various data structures, such as, e.g., a JSON object, although other data structures and storage formats are possible as well.

At 304, method 300 monitors for any changes to the port-level connectivity information that was determined in 302. Such changes can occur, e.g., if a device (or other component) is added to or removed from a data center, if a connection between devices (or other components) is added or removed, and/or if the port used on a given device (to connect that device to a second device) is changed, among other such possibilities. At 306, method 300 determines whether any such change(s) to the port-level connectivity information has been detected. If no such change has been detected, then method 300 returns to 304 and continues monitoring for changes. (As one of skill in the art will appreciate, this loopback to 304 is not intended to be an infinite loop, nor should any inference be interjected into this disclosure with respect to how often the query of 306 and the loopback to 304 are performed. Rather, these steps are provided to show the logical order in which these steps occur in this example embodiment, even if not necessarily the timing or frequency thereof.) If one or more changes to the port-level connectivity information are detected at 306, method 300 proceeds to 308 and updates the port-level connectivity information (that method 300 previously determined) to reflect the change(s) that were detected in 306. At 310, in certain embodiments method 300 passes the updated information to 206 (and/or method 400), which can also be thought of as "calling" the appropriate method or other portion of computer code configured to perform this step. At 312, method 300 determines whether to continue monitoring for change(s) to the port-level connectivity information. In the typical case where this evaluates in the affirmative, method 300 returns to 304 and continues monitoring for changes. (As noted above, this loopback to 304 is not intended to be an infinite loop, nor should any inference be interjected into this disclosure with respect to how often the query of 312 and the loopback to 304 are performed. Rather, these steps are provided to show the logical order in which these steps occur in this example embodiment, even if not necessarily the timing or frequency thereof.) If method 300 determines at 312 not to continue monitoring for changes (e.g., if the system is powered down, if an error occurs, or if a "break" is encountered in the computer code, among other possibilities), then method 300 ends.

Turning next to FIG. 4, FIG. 4 is a flowchart of a method 400 illustrating various actions performed in connection with one embodiment of the systems and techniques disclosed herein. For discussion purposes, the process 400 is described with reference to elements such as those described in connection with FIG. 1A and FIG. 1B as described herein, although other models, frameworks, systems and environments may be used to implement these processes. To provide more detail, FIG. 3 is a flowchart of a process 400 that illustrates various actions that can be performed in conjunction with this disclosure, such as can generally be viewed, e.g., from the perspective of a server (such as, e.g., server 114) and/or a module or other component thereof (such as, e.g., Data Acquisition Module 116 and/or Data Processing Module 118). In certain embodiments, however, process 400 may be performed by any computing device as described herein, and process 400 may also be performed in conjunction with one or more steps of one or more other processes described herein, such as methods 200, 300, and 500. In particular, in certain embodiments FIG. 4 provides enhanced details of step 206. (Although this method does not necessarily include any monitoring and/or loopbacks, this method can also be performed by a thread that is distinct from any thread being used to execute the steps of method 300, method 500, and/or the steps of method 200 other than 206, the details of which are being provided in FIG. 4 and performed by one or more component(s) and/or module(s) that is/are configured to perform method 400.)

In one embodiment, method 400 begins at 402, where method 400 uses the information collected in 202 and the changes discovered in 204 to identify any devices 104 that were the subject of one or more of the changes discovered in 204. (Any such devices 104 may be referred to as "changed device(s).") For example, and referring to the specific configuration shown in FIG. 1A, if a change to device 104(7) is detected (such as, e.g., in 204), step 402 would identify device 104(7) as the changed device.

At 404, method 400 identifies the affected port(s) 122 on the changed device(s) 104. (Any such ports that were affected by a change discovered in 204 may be referred to as "affected port(s).") For instance, and continuing with the example above, the reader will appreciate that each of the following ports 122 on device 104(7) are connected to an external device: Port 122(3)(1), port 122(3)(2), port 122(3)(3), port 122(3)(5), port 122(3)(6), port 122(3)(7), and port 122(3)(y). However, for the sake of simplicity in this example (and as could also be the case in practice), let us assume that ports 122(3)(1) and 122(3)(2) were the only ports on device 104(7) that were actually affected by the configuration change to the changed device, which in this example is device 104(7). As such, step 404 would identify ports 122(3)(1) and 122(3)(2) as the affected ports on the changed device (e.g., device 104(7)).

At 406, method 400 identifies the devices connected to each affected port 122. (Any such connected devices may be referred to as "the impacted device(s).") For instance, and continuing with this same example, the list of devices that are connected to an affected port of device 104(7) would be device 104(2) (which is connected to affected port 122(7)(1) on device 104(7) and device 104(3) (which is connected to affected port 122(7)(2) on device 104(7)). As such, step 406 would identify devices 104(2) and 104(3) as the impacted devices, i.e., the connected devices that were impacted by the change to the changed device (e.g., device 104(7)). (In certain other embodiments, the list of devices that were (at least potentially) impacted can also include devices that are indirectly connected to the changed device. For instance, in certain embodiments, the list of impacted devices may include the devices that are within n-hops (e.g., 2 hops) of the changed device. In still other embodiments, every component within a data center can be (at least potentially) impacted by a change to any other component in the data center, and in such a situation every such device could be included in the list of impacted devices computed in 406.)

At 408, method 400 identifies the specific port of each impacted device that is connected to a changed device. (Any such ports may be referred to as "the impacted port(s).") For instance, and continuing with this same example, the reader will appreciate that impacted device 104(2) is connected to changed device 104(7) at port 122(2)(y) of impacted device 104(2), and impacted device 104(3) is connected to changed device 104(7) at port 122(3)(7) of impacted device 104(3). As such, step 408 would identify ports 122(2)(y) and 122(3)(7) as the impacted ports on the impacted devices (e.g., device 104(2) and device 104(3)).

At 410, method 400 outputs (and/or otherwise stores, passes, etc.) information identifying the impacted devices and impacted ports that were determined elsewhere in method 400. In certain embodiments, this information can take the form of various data structures, such as, e.g., a list, array, dictionary, tuple, and so forth. In the generic sense, in one embodiment this information can take the form of:

```
changed_device: {
    first_affected_port_on_changed_device: {
        impacted_port_impacted_device
    }
    second_affected_port_on_changed_device: {
        impacted_port_impacted_device
    }
}
```

Or, to apply the specific example discussed above, in one embodiment this output could take the form of:

```
device_104(7): {
    port_122(7)(1): {
        port_122(2)(y)_device_104(2)
    }
    port_122(7)(2): {
        port_122(3)(7)_device_104(3)
    }
}
```

In other embodiments, this output could be provided in different formats.

Turning now to FIG. 5, FIG. 5 is a flowchart of a method 500 illustrating various actions performed in connection with one embodiment of the systems and techniques disclosed herein. For discussion purposes, the process 500 is described with reference to elements such as those described in connection with FIG. 1A and FIG. 1B as described herein, although other models, frameworks, systems and environments may be used to implement these processes. To provide more detail, FIG. 5 is a flowchart of a process 500 that illustrates various actions that can be performed in conjunction with this disclosure, such as can generally be viewed, e.g., from the perspective of a server (such as, e.g., server 114) and/or a module or other component thereof (such as, e.g., Data Acquisition Module 116 and/or Data Processing Module 118). In certain embodiments, however, process 500 may be performed by any computing device as described herein, and process 500 may also be performed in conjunction with one or more steps of one or more other processes described herein, such as methods 200, 300, and 400. In particular, in certain embodiments FIG. 5 provides enhanced details of step 208. (Although this method does not necessarily include any monitoring steps, this method can also be performed by a thread that is distinct from any thread being used to execute the steps of method 300, method 400, and/or the steps of method 200 other than 208, the details of which are being provided in FIG. 5 and performed by one or more component(s) and/or module(s) that is/are configured to perform method 500.)

In one embodiment, method 500 begins at 502, where method 500 collects information related to the impacted ports and devices, such as the impacted ports and devices identified by method 400. In certain embodiments, this information can be collected by a device management application or module, such as, e.g., Device Management Application 106 and/or Data Acquisition Module 116. In other embodiments, this information can be collected in other manners, or by other programs, applications, and/or modules. In certain embodiments, this information can be provided to method in the form of a series of key-value pairs for each impacted device and/or impacted port. In certain embodiments, this information can take the form of various data structures, such as, e.g., a list, array, dictionary, tuple, and so forth. In the generic sense, in one embodiment this information can take the form of:

```
device_id_1: {
    key_1 : value_1,
    key_2 : value_2,
    ...
    key_n : value_n
}
device_id_2: {
    key_1 : value_1,
    key_2 : value_2,
    ...
    key_m : value_m
}
```

In other embodiments, this information could be provided in different formats.

At 504, method 500 determines, for each impacted device, information about a recent configuration of that device that was working error free (or at least at a level determined to be acceptable within the context of any given computing environment). (As used herein, such a recent configuration that was working error free (or at least at a level determined to be acceptable (such as, e.g., by a network administrator) within the context of any given computing environment) is referred to as a "Gold Copy." For instance, in certain embodiments a recent configuration may be considered to be working error free if no error logs have been generated for at least a predetermined amount of time (e.g., n hours, where n>0). Moreover, in certain embodiments, a recent configuration may be considered to be a recent configuration may be considered to be working error free (and/or performing at an acceptable level) if, e.g., the throughput of that configuration is higher than other previous settings that were working error free (and/or performing at an acceptable level). In certain embodiments, a system can also store multiple Gold Copies, e.g., a previous configuration that was error free and had a highest throughput historically, a previous configuration that was error free and had a second highest throughput historically, and so on. Moreover, in some cases there may be more than one Gold Copy, in which case the Gold Copies may be ranked (e.g., based on how long error free, bandwidth, throughput speed, etc.) and the method may select the highest ranked Gold Copy, or a certain number of the highest ranked Gold Copies.) As such, at 504 method 500 analyzes the Gold Copy information for each impacted device in order to determine the "Gold Copy" value associated with each key for that impacted device. In certain embodiments, this information can be determined by reading values from a previously-stored Gold Copy. As such, the Gold Copy information for each device_id will contain a list of key-value pairs that are similar to the information collected at 502, but where the key-values represent a previous configuration rather than the current configuration (subsequent to the change that was detected, e.g., in 204). As such, the values of the key-value pairs in the Gold Copy may be different from the values of the key-value pairs collected in 502.

Because the values of the key-value pairs in the Gold Copy are based on a previous configuration that was known to be working well, method 500 can determine the true impact of the changes (that were discovered in 204) to the impacted devices by comparing the values of the key-value pairs in the Gold Copy to the values of the key-value pairs that were collected (or otherwise provided) in 502. This comparison occurs in an iterative manner in steps 506 through 520.

At 506, method 500 compares the first key-value pair from 502 with the corresponding key-value pair from the Gold Copy. (In subsequent iterations through method 500, step 502 compares the next key-value pair from 502 with the corresponding key-value pair from the Gold Copy. Moreover, although not expressly shown in FIG. 5 (primarily for the sake of space), if any key-value pair from 502 does not have a corresponding key-value pair in the Gold Copy, then method 500 can skip that key-value pair and proceed to analyze the next key-value pair from 502, or take other remedial measures.)

At 508, method 500 determines if the value in the key-value pair being analyzed has changed with respect to the value of the corresponding key-value pair in the Gold Copy. If 508 determines that this value has not changed, then the method can determine that this particular value was not actually impacted by the change detected in 204, and that no further processing is needed with respect to that particular key-value pair. As such, method 500 proceeds to 510, where method 500 determines if another key-value pair from 502 remains to be analyzed. If 510 determines that another key-value pair from 502 remains to be analyzed, then method 500 returns to 506; otherwise, method 500 proceeds to 520, which will be discussed in more detail below.

If 508 determines that the value currently being analyzed has not changed as compared to the Gold Copy, then the method proceeds to 512 where the method determines if the impact was positive. If method 500 determines that the impact (as a result of the change detected, e.g., in 204) to the value being currently being analyzed is positive as compared to the associated value in the Gold Copy, then method 500 proceeds to 514 and adds information about the impact to this key-value pair to a list of positive impacts that resulted from the changed detected, e.g., in 204. In certain embodiments, this information be stored in any of various data structures, such as, e.g., a list, array, dictionary, tuple, and so forth. Method 500 then proceeds to 510, where method 500 determines if another key-value pair from 502 remains to be analyzed.

If method 500 determines that the impact (as a result of the change detected, e.g., in 204) to the value being currently being analyzed is not positive as compared to the associated value in the Gold Copy, then method 500 proceeds to 516 where method 500 determines if the impact was negative. If method 500 determines that the impact (as a result of the change detected, e.g., in 204) to the value being currently being analyzed is negative as compared to the associated value in the Gold Copy, then method 500 proceeds to 518 and adds information about the impact to this key-value pair to a list of negative impacts that resulted from the changed detected, e.g., in 204. In certain embodiments, this information be stored in any of various data structures, such as, e.g., a list, array, dictionary, tuple, and so forth. Method 500 then proceeds to 510, where method 500 determines if another key-value pair from 502 remains to be analyzed.

The reader will also appreciate that, although steps 508 through 518 are shown as distinct steps for the sake of explanation herein, in practice these steps can be combined into fewer steps, and/or performed in a different order. For instance, since the only possible logical outcomes of the comparisons made in steps 508, 512, and 516 are "no change," "positive change," and "negative change"—in other words, the value being tested can only be either greater than, less than, or equal to the associated Gold Copy value—one of these steps can be omitted or treated as a default result. For instance, if 508 and 512 both evaluate in the negative, then 516 can be assumed as being true without having to actually perform the comparison therein. For similar reasons, these steps in particular can also be performed in any order with respect to each other.

Regardless of the exact order and manner in which steps 508, 512, 514, 516, and 518 are performed (if at all), step 510 will eventually evaluate in the negative when no more key-value pairs remain to be analyzed. When 510 evaluates in the negative, method 500 proceeds to method 520 and outputs the results of the method, e.g., the information included in the lists (or other collections of information) that were determined in steps 514 and 518. These outputted results can be reported to various persons, such as, e.g., system administrators, and they can also be automatically reported back to one or more of the impacted devices 104. Moreover, in certain embodiments, an additional step (that is not expressly shown in FIG. 5) can also be performed at this point to determine if any values will be effective by more than an allowable (or threshold) amount in the negative direction, in which case an appropriate warning or alert may be issued, or other appropriate remedial measures may be taken (such as, e.g., blocking the change detected in 204 from occurring and/or undoing the change if it already occurred, or shutting down the adversely affected device 104, among other such possibilities). The information that is outputted in 520 can also highlight the positive impacts of the change and the negative impacts of the changes, or, in certain embodiments, to highlight any such changes that exceed a threshold change in either direction. Moreover, the information outputted in 520 can also be used to performing post-impact root cause analysis, detect issues before they become problems that are otherwise noticeable, and prevent future problems from occurring, among other features and benefits of the disclosure provided herein.

Figure 6:
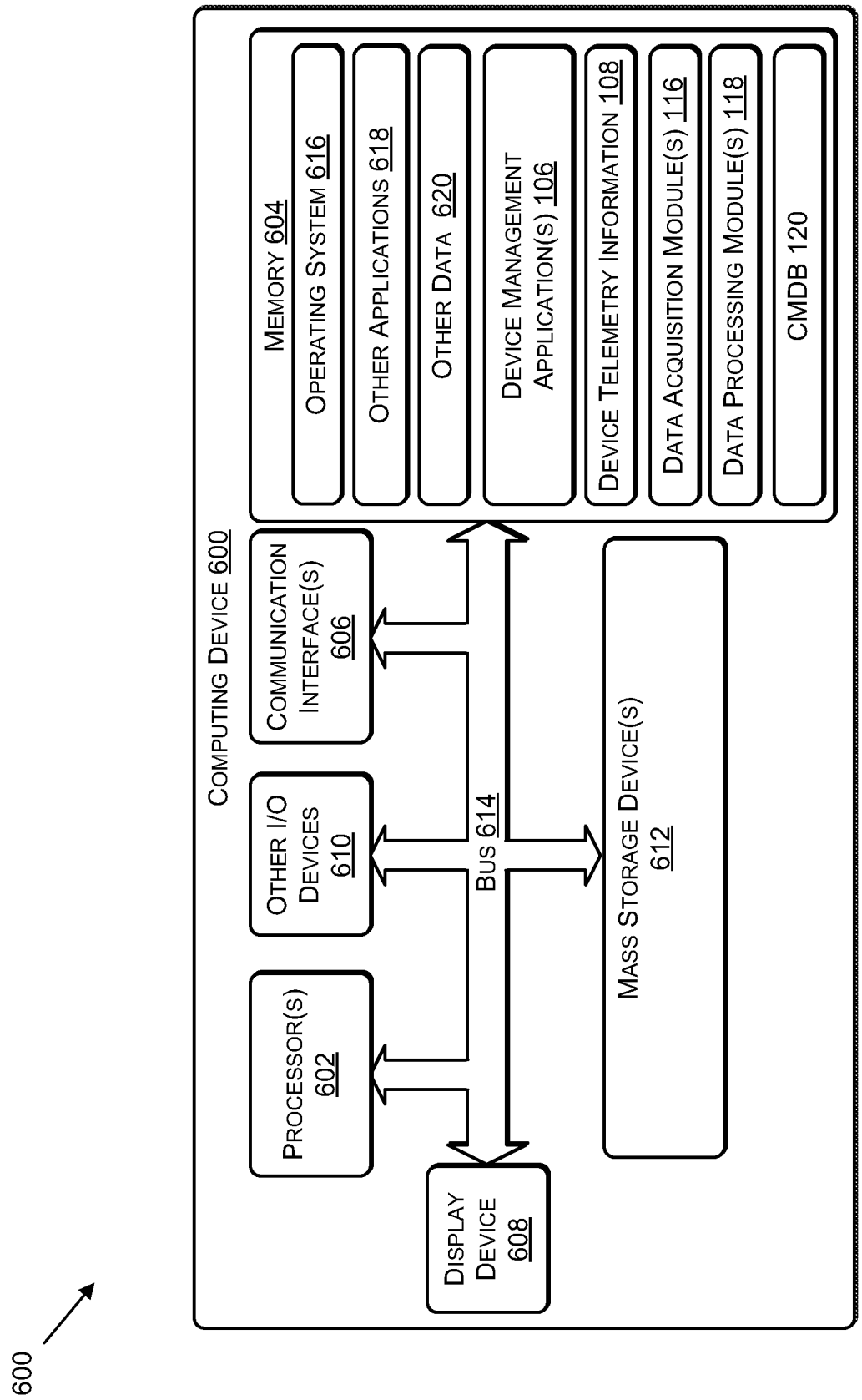
FIG. 6 illustrates an example configuration of a computing device that can be used to implement the systems and techniques described herein.

FIG. 6 illustrates an example configuration of a computing device 600 that can be used to implement the systems and techniques described herein, such as, for example, any device 104 that is a computing device, server 114, or another component illustrated in FIG. 1A and/or FIG. 1B. The computing device 600 may include one or more processors 602, a memory 604, communication interfaces 606, a display device 608, other input/output (I/O) devices 610, and one or more mass storage devices 612, configured to communicate with each other, such as via one or more system buses 614 or other suitable connection. While a single bus 614 is illustrated for ease of understanding, it should understood that the system bus 614 may include multiple buses, such as memory device buses, storage device buses, power buses, video signal buses, and the like.

The processor(s) 602 are one or more hardware devices that may include a single processing unit or a number of processing units, all of which may include single or multiple computing units or multiple cores. The processor(s) 602 may be implemented as one or more microprocessors, microcomputers, microcontrollers, digital signal processors, central processing units, graphics processing units, state machines, logic circuitries, and/or any hardware devices that manipulate signals based on operational instructions. Among other capabilities, the processor(s) 602 may be configured to fetch and execute computer-readable instructions stored in the memory 604, mass storage devices 612, or other computer-readable media.

Memory 604 and mass storage devices 612 are examples of computer storage media (e.g., memory storage devices) for storing instructions that can be executed by the processor 602 to perform the various functions described herein. For example, memory 604 may include both volatile memory and non-volatile memory (e.g., random access memory (RAM), read-only memory (ROM), or the like) devices. Further, mass storage devices 612 may include hard disk drives, solid-state drives, removable media, including external and removable drives, memory cards, flash memory, floppy disks, optical disks (e.g., CD, DVD), a storage array, a network attached storage, a storage area network, or the like. Both memory 604 and mass storage devices 612 may be collectively referred to as memory or computer storage media herein, and may be a media capable of storing computer-readable, processor-executable program instructions as computer program code that can be executed by the processor 602 as a particular machine configured for carrying out the operations and functions described in the implementations herein.

The computing device 600 may also include one or more communication interfaces 606 for exchanging data, e.g., via one or more connections 110 with network 112 and/or any other component connected directly or indirectly to a computing device. The communication interfaces 606 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, cellular, satellite, etc.), the Internet and the like. Communication interfaces 606 can also provide communication with external storage (not shown), such as in a storage array, network attached storage, storage area network, or the like. A display device 608, such as a monitor may be included in some implementations for displaying information and images to users. Other I/O devices 610 may be devices that receive various inputs from a user and provide various outputs to the user, and may include a keyboard, a remote controller, a mouse, a printer, audio input/output devices, and so forth.

The computer storage media, such as memory 604 and mass storage devices 612, may be used to store software and data. For example, the computer storage media may be used to store one or more applications or software modules, such as, e.g., Device Management Application 106, Data Acquisition Module 116, Data Processing Module 118; device telemetry information or other configuration information, such as, e.g., Device Telemetry Information 108; a database or other data store, such as, e.g., CMDB 120; an operating system 616; other applications 618; and other data 620.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one embodiment," "this embodiment," "these embodiment," "certain embodiments," or "some embodiment," means that a particular feature, structure, or characteristic described is included in at least one embodiment, and the appearances of these phrases in various places in the specification are not necessarily all referring to the same embodiment.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   determining connectivity information associated with a data center, wherein
     the data center comprises a plurality of connected devices, and
     the plurality of connected devices comprises at least a first device and a second device;
   discovering one or more changes to a configuration of the first device;
   determining that the second device is impacted by the one or more changes to the configuration of the first device, wherein
     the second device is connected to the first device, and
     the determining that the second device is impacted is based, at least in part, on the connectivity information; and
   determining one or more impacts to the second device as a result of the one or more changes, wherein
     each of the one or more impacts indicates that at least one of the following occurred as a result of the one or more changes:
       a positive impact to the second device,
       a negative impact to the second device, or
       no impact to the second device.

2. The method of claim 1, wherein:
the connectivity information comprises port-level connectivity information.

3. The method of claim 2, wherein
determining that the second device is impacted comprises analyzing the port-level connectivity information.

4. The method of claim 1, further comprising
determining one or more current key-value pairs related to the second device, wherein
  each of the one or more current key-value pairs comprises a value that was determined subsequent to the one or more changes to the configuration of the first device, and
determining one or more previous key-value pairs from a previous configuration of the second device that was known to be working, wherein each of the one or more previous key-value pairs comprises a value that was determined prior to the one or more changes being made to the configuration of the first device.

5. The method of claim 4, wherein:
the determining the one or more impacts comprises comparing each of the one or more current key-value pairs to a corresponding one of the one or more previous key-value pairs to determine a plurality of results of the analyzing, wherein
the plurality of results of the analyzing indicates, for each current key-value pair, that the change had one of:
a positive impact on the second device,
a negative impact on the second device, or
no impact on the second device.

6. The method of claim 5, further comprising:
generating a plurality of lists of impacts to the second device, wherein
the plurality of lists comprises a list of positive impacts and a list of negative impacts,
the list of positive impacts comprises information about one or more positive impacts to the second device as a result of any of the one or more changes to the configuration of the first device, and
the list of negative impacts comprises information about one or more negative impacts to the second device as a result of any of the one or more changes to the configuration of the first device; and
displaying at least a portion of the list of positive impacts and at least a portion of the list of negative impacts.

7. The method of claim 5, further comprising:
subsequent to the determining one or more impacts to the second device as a result of the one or more changes, performing at least one remedial measure, wherein
the at least one remedial measure is identified based, at least in part, on the results.

8. The method of claim 1, wherein:
the plurality of connected devices comprises at least one device that is connected to the first device but was not impacted by any of the one or more changes to the configuration of the first device.

9. A computing device comprising:
one or more processors; and
one or more non-transitory computer-readable storage media to store instructions executable by the one or more processors to perform operations comprising:
determining connectivity information associated with a data center, wherein
the data center comprises a plurality of connected devices, and
the plurality of connected devices comprises at least a first device and a second device;
discovering one or more changes to a configuration of the first device;
determining that the second device is impacted by the one or more changes to the configuration of the first device, wherein
the second device is connected to the first device, and
the determining that the second device is impacted is based, at least in part, on the connectivity information; and
determining one or more impacts to the second device as a result of the one or more changes, wherein
each of the one or more impacts indicates that at least one of the following occurred as a result of the one or more changes:
a positive impact to the second device,
a negative impact to the second device, or
no impact to the second device.

10. The computing device of claim 8, wherein
the connectivity information comprises port-level connectivity information; and
determining that the second device is impacted comprises analyzing the port-level connectivity information.

11. The computing device of claim 9, wherein the operations further comprise:
determining one or more current key-value pairs related to the second device, wherein
each of the one or more current key-value pairs comprises a value that was determined subsequent to the one or more changes to the configuration of the first device, and
determining one or more previous key-value pairs from a previous configuration of the second device that was known to be working, wherein
each of the one or more previous key-value pairs comprises a value that was determined prior to the one or more changes being made to the configuration of the first device.

12. The computing device of claim 11, wherein
the determining the one or more impacts comprises comparing each of the one or more current key-value pairs to a corresponding one of the one or more previous key-value pairs to determine a plurality of results of the analyzing, wherein
the plurality of results of the analyzing indicates, for each current key-value pair, that the change had one of:
a positive impact on the second device,
a negative impact on the second device, or
no impact on the second device.

13. The computing device of claim 12, wherein the operations further comprise:
generating a plurality of lists of impacts to the second device, wherein
the plurality of lists comprises a list of positive impacts and a list of negative impacts,
the list of positive impacts comprises information about one or more positive impacts to the second device as a result of any of the one or more changes to the configuration of the first device, and
the list of negative impacts comprises information about one or more negative impacts to the second device as a result of any of the one or more changes to the configuration of the first device;
displaying at least a portion of the list of positive impacts and at least a portion of the list of negative impacts; and
subsequent to the determining one or more impacts to the second device as a result of the one or more changes, performing at least one remedial measure, wherein
the at least one remedial measure is identified based, at least in part, on the results.

14. The computing device of claim 9, wherein
the plurality of connected devices comprises at least one device that is connected to the first device but was not impacted by any of the one or more changes to the configuration of the first device.

15. One or more non-transitory computer-readable storage media to store instructions executable by one or more processors to perform operations comprising:
determining connectivity information associated with a data center, wherein the data center comprises a plurality of connected devices, and the plurality of connected devices comprises at least a first device and a second device;

discovering one or more changes to a configuration of the first device;

determining that the second device is impacted by the one or more changes to the configuration of the first device, wherein the second device is connected to the first device, and the determining that the second device is impacted is based, at least in part, on the connectivity information; and determining one or more impacts to the second device as a result of the one or more changes, wherein each of the one or more impacts indicates that at least one of the following occurred as a result of the one or more changes:

a positive impact to the second device, a negative impact to the second device, or no impact to the second device.

16. The one or more non-transitory computer-readable storage media of claim 15, wherein the connectivity information comprises port-level connectivity information; and determining that the second device is impacted comprises analyzing the port-level connectivity information.

17. The one or more non-transitory computer-readable storage media of claim 15, wherein the operations further comprise:

determining one or more current key-value pairs related to the second device, wherein each of the one or more current key-value pairs comprises a value that was determined subsequent to the one or more changes to the configuration of the first device, and determining one or more previous key-value pairs from a previous configuration of the second device that was known to be working, wherein each of the one or more previous key-value pairs comprises a value that was determined prior to the one or more changes being made to the configuration of the first device.

18. The one or more non-transitory computer-readable storage media of claim 17, wherein the determining the one or more impacts comprises comparing each of the one or more current key-value pairs to a corresponding one of the one or more previous key-value pairs to determine a plurality of results of the analyzing, wherein the plurality of results of the analyzing indicates, for each current key-value pair, that the change had one of:

a positive impact on the second device, a negative impact on the second device, or no impact on the second device.

19. The one or more non-transitory computer-readable storage media of claim 18, wherein the operations further comprise:

generating a plurality of lists of impacts to the second device, wherein the plurality of lists comprises a list of positive impacts and a list of negative impacts, the list of positive impacts comprises information about one or more positive impacts to the second device as a result of any of the one or more changes to the configuration of the first device, and the list of negative impacts comprises information about one or more negative impacts to the second device as a result of any of the one or more changes to the configuration of the first device;

displaying at least a portion of the list of positive impacts and at least a portion of the list of negative impacts; and subsequent to the determining one or more impacts to the second device as a result of the one or more changes, performing at least one remedial measure, wherein the at least one remedial measure is identified based, at least in part, on the results.

20. The one or more non-transitory computer-readable storage media of claim 15, wherein the plurality of connected devices comprises at least one device that is connected to the first device but was not impacted by any of the one or more changes to the configuration of the first device.

* * * * *